United States Patent
Lyu

(10) Patent No.: US 12,457,163 B2
(45) Date of Patent: Oct. 28, 2025

(54) METHOD, APPARATUS, AND SYSTEM FOR CONTROLLING A FLOW ENTRY

(71) Applicant: Alibaba Group Holding Limited, Grand Cayman (KY)

(72) Inventor: Yilong Lyu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 579 days.

(21) Appl. No.: 17/864,291

(22) Filed: Jul. 13, 2022

(65) Prior Publication Data
US 2022/0353170 A1 Nov. 3, 2022

Related U.S. Application Data

(63) Continuation of application No. PCT/CN2021/070603, filed on Jan. 7, 2021.

(30) Foreign Application Priority Data

Jan. 13, 2020 (CN) .......................... 202010031724.8

(51) Int. Cl.
*H04L 45/02* (2022.01)
*H04L 45/00* (2022.01)
*H04L 49/00* (2022.01)

(52) U.S. Cl.
CPC .............. *H04L 45/02* (2013.01); *H04L 45/38* (2013.01); *H04L 49/70* (2013.01)

(58) Field of Classification Search
CPC ......... H04L 45/02; H04L 45/38; H04L 49/70; H04L 45/54; H04L 49/00; H04L 45/74
See application file for complete search history.

(56) References Cited

U.S. PATENT DOCUMENTS

| 6,097,718 | A | 8/2000 | Bion | |
|---|---|---|---|---|
| 2005/0276230 | A1* | 12/2005 | Akahane | H04L 43/00 370/252 |
| 2014/0019639 | A1* | 1/2014 | Ueno | H04L 47/125 709/238 |

(Continued)

FOREIGN PATENT DOCUMENTS

| CN | 1451215 A | 10/2003 |
|---|---|---|
| CN | 104170332 A | 11/2014 |

(Continued)

OTHER PUBLICATIONS

Fast Invalid TCP Flow Removal Scheme for improving SDN Scalability, R. Ying et al., IEEE, 2019 (Year: 2019).*

(Continued)

*Primary Examiner* — Habte Mered
(74) *Attorney, Agent, or Firm* — Lee & Hayes, P.C.

(57) ABSTRACT

A method including controlling a second network device to add the flow entry, so that the second network device performs message forwarding according to the flow entry; and after controlling the second network device to add the flow entry, receiving a message matching the flow entry and controlling the second network device to delete the flow entry under a certain condition, wherein the first network device is responsible for control of time for deleting the flow entry based on a protocol state of the flow entry. The present disclosure improves the rationality of the aging of the flow entry in the second network device.

20 Claims, 9 Drawing Sheets

CONTROL SECOND NETWORK DEVICE TO ADD FLOW ENTRY, SO THAT SECOND NETWORK DEVICE PERFORMS MESSAGE FORWARDING ACCORDING TO FLOW ENTRY
502

AFTER CONTROLLING SECOND NETWORK DEVICE TO ADD FLOW ENTRY, RECEIVE MESSAGE MATCHING FLOW ENTRY AND CONTROL SECOND NETWORK DEVICE TO DELETE FLOW ENTRY UNDER CERTAIN CONDITION
504

(56) References Cited

U.S. PATENT DOCUMENTS

| | | | | |
|---|---|---|---|---|
| 2014/0215561 | A1* | 7/2014 | Roberson | H04L 63/02 726/3 |
| 2015/0195183 | A1* | 7/2015 | Park | H04L 41/0895 709/242 |
| 2016/0212096 | A1* | 7/2016 | Gao | H04L 63/02 |
| 2017/0052856 | A1* | 2/2017 | Subbarayalu | G06F 11/2023 |
| 2020/0364156 | A1* | 11/2020 | Wang | G06F 12/123 |
| 2022/0043756 | A1* | 2/2022 | Wang | H04L 45/54 |

FOREIGN PATENT DOCUMENTS

| | | |
|---|---|---|
| CN | 104579718 A | 4/2015 |
| CN | 105407073 A | 3/2016 |
| CN | 107171884 A | 9/2017 |
| CN | 109510878 A | 3/2019 |
| CN | 109600318 A | 4/2019 |
| CN | 110557331 A | 12/2019 |
| EP | 3531622 A1 | 8/2019 |

OTHER PUBLICATIONS

Expedited Eviction of Invalid Flow Entries for SDN based EPC Networks, R. Ying, W. Jia, C. Luo and Y. Wu, IEEE, 2019 (Year: 2019).*
Translation of CN First Search Report for corresponding CN Application No. 202010031724.8 mailed May 9, 2022, 2 pages.
Translation of CN Office Action for corresponding CN Application No. 202010031724.8 mailed Oct. 31, 2022, 5 pages.
Translation of PCT search report for corresponding PCT Application No. PCT/CN2021/070603 mailed Jul. 22, 2021, 2 pages.
Translation of PCT written opinion for corresponding PCT Application No. PCT/CN2021/070603 mailed Jul. 13, 2022, 3 pages.
Translation of CN Office Action and Search Report for corresponding CN Application No. 202010031724.8 mailed Feb. 21, 2024, 18 pages.
Office Action for Singapore Application No. 11202251278C, Dated May 7, 2025, 9 pages.

* cited by examiner

METHOD, APPARATUS, AND SYSTEM FOR CONTROLLING A FLOW ENTRY

CROSS REFERENCE TO RELATED APPLICATIONS

This application claims priority to and is a continuation of PCT Patent Application No. PCT/CN2021/070603, filed on 7 Jan. 2021 and entitled "METHOD, APPARATUS, AND SYSTEM FOR CONTROLLING A FLOW ENTRY," which claims priority to Chinese Patent Application No. 202010031724.8, filed on 13 Jan. 2020 and entitled "METHOD, APPARATUS, AND SYSTEM FOR CONTROLLING A FLOW ENTRY," which are incorporated herein by reference in their entirety.

TECHNICAL FIELD

The present disclosure relates to the field of Internet technologies, and, more particularly, to a method, an apparatus, and a system for controlling a flow entry.

BACKGROUND

A virtual switch is a type of software that runs on a host and is responsible for simulating a physical switch to complete traffic forwarding. The virtual switch can cooperate with a smart network interface card which assists the virtual switch in handling network load.

The virtual switch and the smart network interface card usually cooperate as follows: 1. when a message enters the host, it first passes through the smart network interface card which performs a lookup on a flow table to determine a flow entry hit by the message; 2. if the message hits a flow entry, it is directly forwarded according to the flow entry, and if the message misses a flow entry, it is reported to the virtual switch on the host; and 3. the virtual switch will generate a flow entry corresponding to the message, perform forwarding processing on the message according to the generated flow entry, and send the flow entry to the smart network interface card, so that subsequent messages can directly hit the flow entry on the smart network interface card for forwarding processing. In addition, the virtual switch sets for the smart network interface card aging time of the flow entry. The aging time refers to the amount of time elapsed from the moment that the flow entry is last hit to the moment that the flow entry is deleted. If the flow entry reaches the aging time, the smart network interface card needs to delete the flow entry.

When the above-mentioned cooperation method is used, however, a problem of irrational aging of flow entries on the smart network interface card is observed.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Embodiments of the present disclosure provide methods, apparatuses, and systems for controlling a flow entry, which are used to solve the problem of irrational aging of flow entries on smart network interface cards in the prior art.

An example embodiment of the present disclosure provides a method for controlling a flow entry, applied to a first network device, wherein the method comprises:
  controlling a second network device to add the flow entry, so that the second network device performs message forwarding according to the flow entry; and
  after controlling the second network device to add the flow entry, receiving a message matching the flow entry and controlling the second network device to delete the flow entry under a certain condition;
  wherein the first network device is responsible for control of time for deleting the flow entry based on a protocol state of the flow entry.

An example embodiment of the present disclosure provides a method for controlling a flow entry, applied to a second network device, wherein the method comprises:
  in response to control of a first network device, adding the flow entry;
  according to the flow entry, performing forwarding processing on a received message matching the flow entry; and
  forwarding the message to the first network device, so that the first network device, according to the message, controls the second network device to delete the flow entry under a certain condition;
  wherein the first network device is responsible for control of time for deleting the flow entry based on a protocol state of the flow entry.

An example embodiment of the present disclosure provides an apparatus for controlling a flow entry, applied to a first network device, wherein the apparatus comprises:
  a first control module, configured to control a second network device to add the flow entry, so that the second network device performs message forwarding according to the flow entry; and
  a second control module, configured to, after controlling the second network device to add the flow entry, receive a message matching the flow entry and control the second network device to delete the flow entry under a certain condition;
  wherein the first network device is responsible for control of time for deleting the flow entry based on a protocol state of the flow entry.

An example embodiment of the present disclosure provides an apparatus for controlling a flow entry, comprising: a memory and a processor; wherein the memory is configured to store one or more computer instructions, and the one or more computer instructions, when executed by the processor, implement the method according to any one of the above method embodiments.

An example embodiment of the present disclosure provides an apparatus for controlling a flow entry, wherein the apparatus comprises a field-programmable logic device, and the field-programmable logic device is configured to:
  in response to control of a first network device, add the flow entry;
  according to the flow entry, perform forwarding processing on a received message matching the flow entry; and
  forward the message to the first network device, so that the first network device, according to the message, controls the second network device to delete the flow entry under a certain condition;
  wherein the first network device is responsible for control of time for deleting the flow entry based on a protocol state of the flow entry.

An example embodiment of the present disclosure provides a system for controlling a flow entry, comprising the apparatuses according to the above apparatus embodiments.

Embodiments of the present disclosure further provide a computer-readable storage medium having a computer program stored thereon, wherein the computer program includes at least one piece of code, and the at least one piece of code can be executed by a computer to control the computer to execute the method according to any one of the above method embodiments.

Embodiments of the present disclosure further provide a computer program, wherein the computer program is configured to, when executed by a computer, implement the method according to any one of the method embodiments.

According to the method, the apparatus, and the system for controlling a flow entry provided by the embodiments of the present disclosure, a first network device controls a second network device to add the flow entry, and the second network device, after receiving a message matching the flow entry, performs forwarding processing on the message according to the flow entry; the second network device forwards the message to the first network device, and the first network device controls the second network device to delete the flow entry under a certain condition according to the received message matching the flow entry, wherein the first network device is responsible for control of time for deleting the flow entry based on a protocol state of the flow entry, so that when the second network device performs message forwarding according to the flow entry, the first network device can perform aging management on the flow entry on the second network device according to the protocol state of the flow entry, thus enabling the aging of the flow entry on the second network device to meet the requirement for performing aging management on the flow entry based on the protocol state of the flow entry and avoiding problems caused by irrational aging of the flow entry on the second network device in the related art, such as the problem that the message cannot be forwarded normally due to early deletion of the flow entry on the second network device, or the problem that the message is forwarded incorrectly due to delayed deletion of the flow entry on the second network device, thereby improving the rationality of the aging of the flow entry on the second network device.

BRIEF DESCRIPTION OF DRAWINGS

To describe the technical solutions in the embodiments of the present disclosure or in the prior art more clearly, the following briefly describes the accompanying drawings needed for describing the embodiments or the prior art. Apparently, the accompanying drawings in the following description show some embodiments of the present disclosure, and those of ordinary skill in the art may further derive other accompanying drawings from these accompanying drawings without creative efforts.

DESCRIPTION OF EMBODIMENTS

Figure 1:
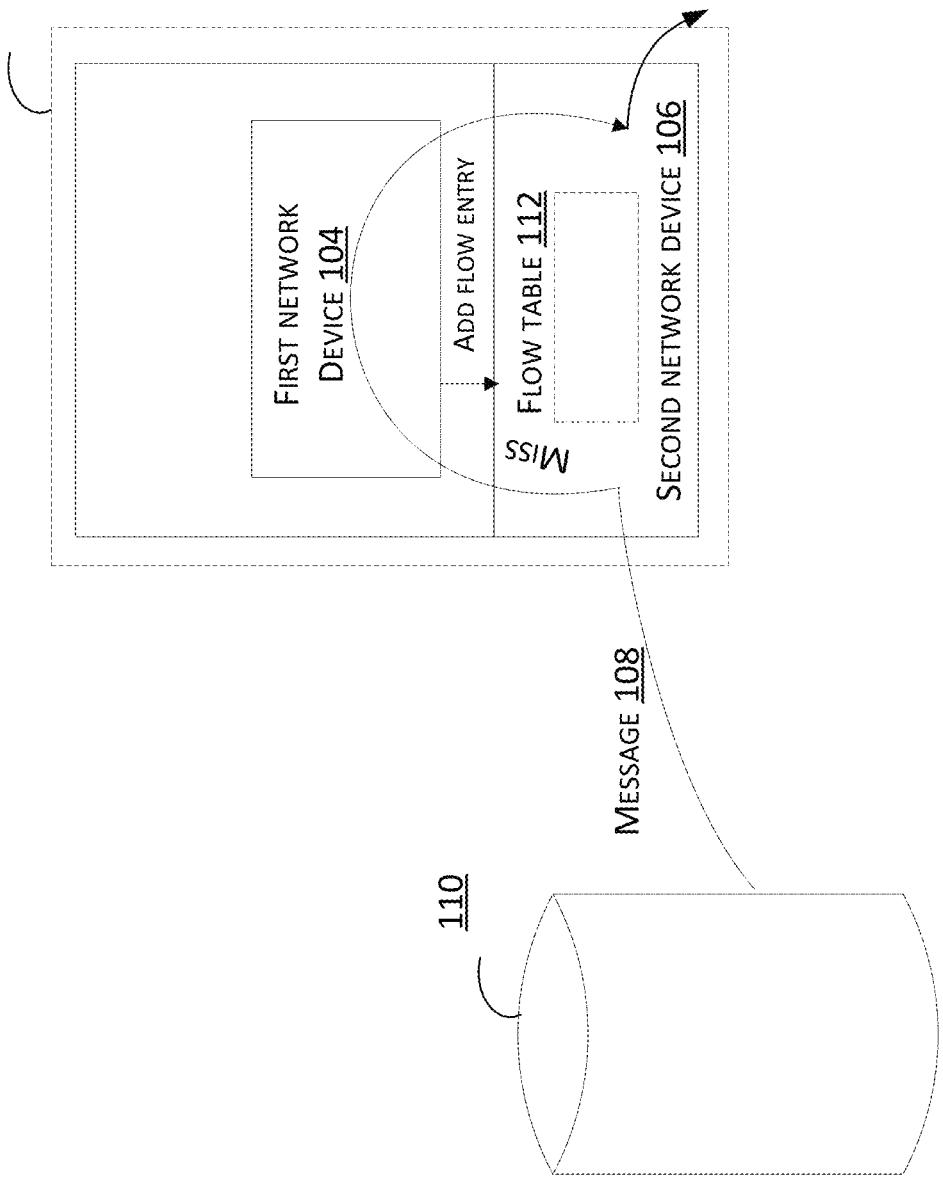
FIGS. 1-2 are schematic diagrams of application scenarios of the embodiments of the present disclosure.

In order to make the objectives, technical solutions, and advantages of the embodiments of the present disclosure clearer, the technical solutions in the embodiments of the present disclosure will be described clearly and completely hereinafter in conjunction with the accompanying drawings in the embodiments of the present disclosure. Apparently, the described embodiments are a part of, rather than all, embodiments of the present disclosure. Based on the embodiments in the present disclosure, all other embodiments obtained by ordinary persons skilled in the art without creative efforts shall fall within the protection scope of the present disclosure.

The terms used in the embodiments of the present disclosure are for the purpose of describing specific embodiments only and are not intended to limit the present disclosure. The singular forms "a," "the," and "said" used in the embodiments and appended claims of the present disclosure are also intended to represent the plural forms thereof. Unless otherwise clearly noted in the context, "a plurality of" generally includes at least two, but including at least one should not be excluded.

It should be appreciated that the term "and/or" used herein is merely an association relationship describing associated objects, indicating that there may be three relations. For example, A and/or B may indicate the following three cases: A exists individually, A and B exist simultaneously, and B exists individually. In addition, the character "/" herein generally indicates that the associated objects before and after the character form an "or" relation.

Depending on the context, the term "if" as used herein may be interpreted as "when," or "in the case that," or "in response to a determination," or "in response to a detection." Similarly, depending on the context, the phrase "if determined" or "if detecting (a stated condition or event)" may be interpreted as "when determined" or "in response to a determination," or "when detecting (a stated condition or event)" or "in response to detecting (a stated condition or event)."

It should also be noted that the term "comprise," "include," or any other variant thereof is intended to encompass a non-exclusive inclusion, so that a product or system that involves a series of elements comprises not only those elements, but also other elements not explicitly listed, or elements that are inherent to such a product or system. Without more restrictions, an element defined by the phrase "comprising a . . . " does not exclude the presence of another same element in the product or system that comprises the element.

In addition, the sequence of steps in the following method embodiments is only an example and is not to impose a strict limitation.

In order to facilitate those skilled in the art to understand the technical solutions provided by the embodiments of the present disclosure, the technical environment for implementing the technical solutions is first described below.

The commonly used methods of cooperation between a virtual switch and a smart network interface card in the related art mainly comprise the virtual switch generating a flow entry and sending it to the smart network interface card, and the smart network interface card performing message forwarding according to the flow entry and performing aging management on the flow entry according to aging time configured on the virtual switch. However, fixed aging time is irrational for flow entries in different protocol states. Therefore, a rational method for controlling the aging of flow entries on the smart network interface card is urgently needed in the related art.

Based on the actual technical requirements similar to those described above, the method for controlling a flow entry provided by the present disclosure can achieve rational control of the aging of the flow entry on the smart network interface card by technical means.

The methods for controlling a flow entry provided by the embodiments of the present disclosure are specifically described below in conjunction with exemplary application scenarios.

As shown in FIG. 1, a network node 102 composed of a first network device 104 and a second network device 106 receives a message 108 sent by an upper-level node 110 thereof through the Internet, and the upper-level node 110 is a source device of the message 108 or an intermediate network node on the Internet, wherein the source device may be, for example, a personal computer, a laptop computer, a cell phone, a personal digital assistant, a server, or the like. As shown in FIG. 1, the message 108 first passes through the second network device 106 of the network node 102, and the second network device 106 performs a lookup on the flow table 112. Supposing the message 108 misses a flow entry on the flow table 112, the second network device 106 reports the message 108 to the first network device 104. When the first network device 104 determines that there is no message matching the message 108, it generates a flow entry corresponding to the message 108 and sets the initial protocol state of the flow entry; and when the first network device 104 determines that there is a message matching the message 108, it updates the protocol state of the flow entry corresponding to the message 108.

Here, the protocol state of the flow entry refers to the state of the communication protocol corresponding to the flow entry. The Transmission Control Protocol (TCP) is taken as an example of the communication protocol for description herein, and the protocol state of the flow entry may include a synchronization sent (SYN SENT) state, a synchronization received (SYN RCVD) state, an established (ESTABLISHED) state for connection, or the like.

The first network device 104 may comprise a virtual switch, or the first network device 104 may comprise a non-virtual switch. The second network device 106 may comprise a network interface card, a gateway device, a load balancing device, a router, or the like. It should be noted that a virtual switch as the first network device and a smart network interface card as the second network device are only possible embodiments, and in practical application, the first network device and the second network device may also comprise other forms.

Figure 2:
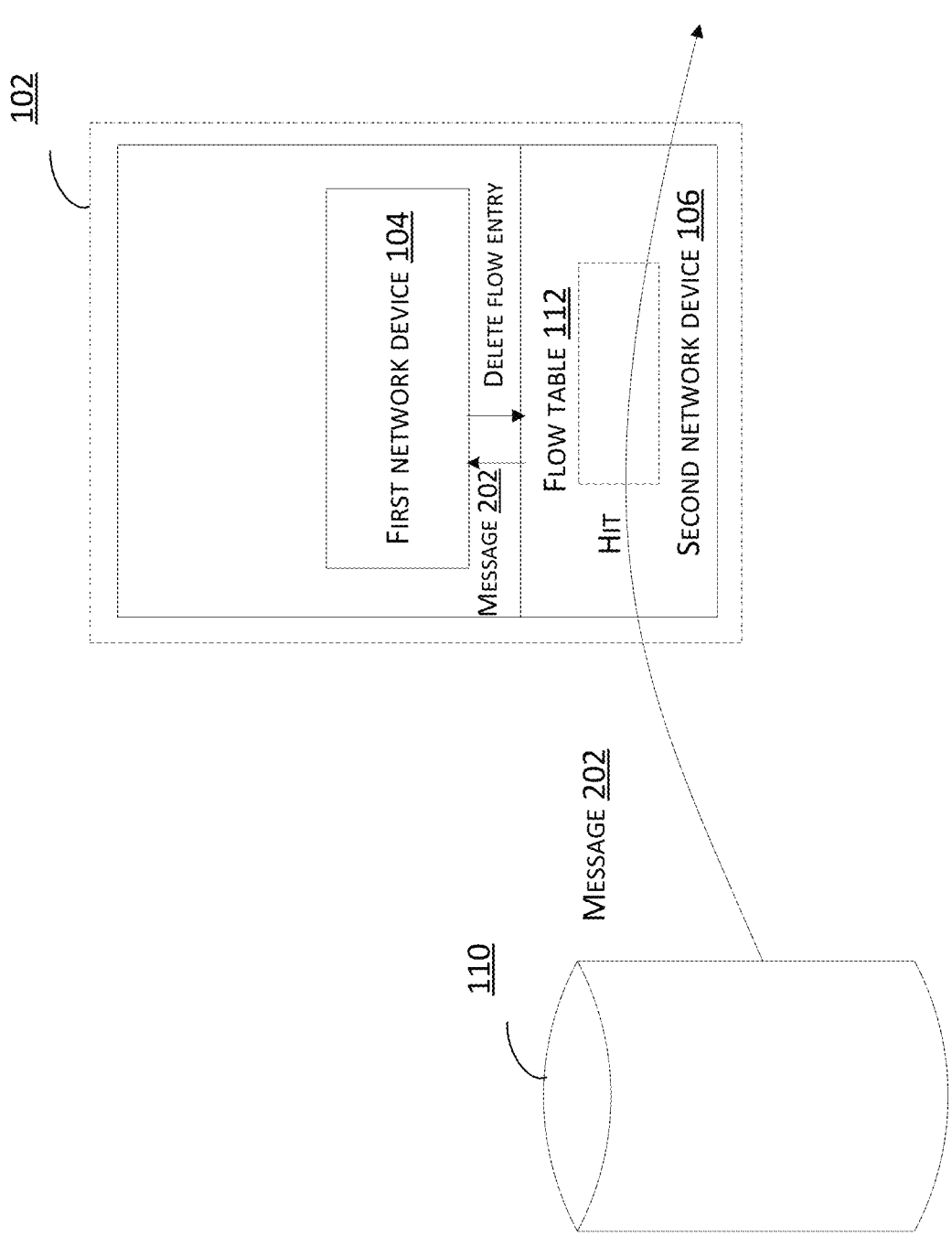

As shown in FIG. 1, after generating the flow entry corresponding to the message1, the first network device 104 may control the second network device 106 to add the flow entry, so that the second network device 106 performs message forwarding according to the flow entry to improve forwarding performance. After the first network device 104 controls the second network device 106 to add the flow entry, as shown in FIG. 2, when the second network device receives a message 202 matching the flow entry, it can not only perform forwarding processing on the message 20202 according to the flow entry but also forward the message 202 to the first network device, so that the first network device can control the second network device to delete the flow entry under a certain condition according to the message 202.

Here, the first network device is responsible for performing aging management on the flow entry based on the protocol state of the flow entry. Since the first network device is responsible for performing aging management on the flow entry based on the protocol state of the flow entry, and the first network device can control the second network device to delete the flow entry under a certain condition, it is implemented that when the second network device performs message forwarding according to the flow entry, the first network device can perform aging management on the flow entry on the second network device according to the protocol state of the flow entry, thus enabling aging of the flow entry on the second network device to meet the requirement for performing aging management on the flow entry based on the protocol state of the flow entry and avoiding problems caused by irrational aging of the flow entry on the second network device in the related art, such as the problem that the message cannot be forwarded normally due to early deletion of the flow entry on the second network device, or the problem that the message is forwarded incorrectly due to delayed deletion of the flow entry on the second network device, thereby improving the rationality of the aging of the flow entry on the second network device.

It should be noted that, for a message that hits the flow entry on the second network device, the second network device can perform forwarding processing on the message according to the flow entry; and for a message that misses a flow entry on the second network device, the first network device can perform forwarding processing on the message according to the flow entry, for example, the first network device can perform forwarding processing on the message 108 according to the flow entry, and the second network device can perform forwarding processing on the message 202 according to the flow entry.

It should be noted that, when forwarding processing is performed on the message according to the flow entry, the recipients of the message may be different in different application scenarios. For example, in a load balancing scenario, performing forwarding processing on the message according to the flow entry may specifically refer to forwarding the message to a specific virtual machine in a virtual machine cluster or a specific server in a server cluster. For another example, in a network forwarding scenario, performing forwarding processing on the message according to the flow entry may specifically refer to forwarding the message to a lower-level message forwarding device or a destination device of the message.

Some embodiments of the present disclosure will be described in detail below with reference to the accompanying drawings. When there is no conflict, the embodiments described below and the features in the embodiments may be combined with each other.

Figure 3:
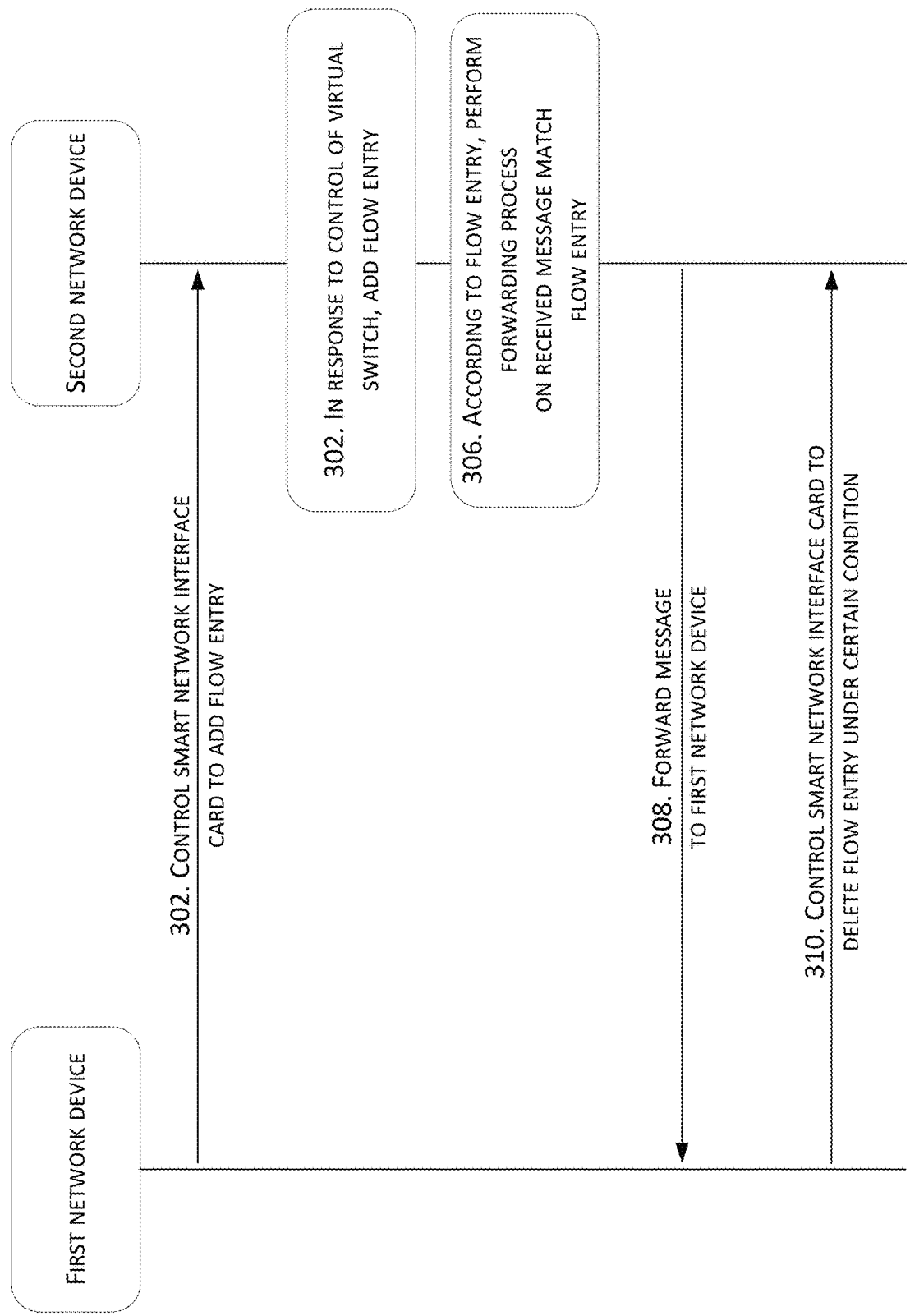
FIG. 3 is a schematic flowchart of a method for controlling a flow entry provided by an embodiment of the present disclosure.

FIG. 3 is a schematic flowchart of a method for controlling a flow entry provided by an embodiment of the present disclosure. As shown in FIG. 3, the method provided by this embodiment may comprise the following steps:

Step 302, a first network device controls a second network device to add the flow entry;

Step 304, in response to control of the first network device, the second network device adds the flow entry;

Step 306, the second network device, according to the flow entry, performs forwarding processing on a received message matching the flow entry.

Step 308, the second network device forwards the message to the first network device, so that the first network device updates a protocol state of the flow entry according to the message; and Step 310, the first network device receives the message matching the flow entry and controls the second network device to delete the flow entry under a certain condition;

wherein the first network device is responsible for control of time for deleting the flow entry based on the protocol state of the flow entry.

In this embodiment of the present disclosure, the flow entry may be generated by the first network device according to the received message. For example, as shown in FIG. 1, when the message 108 received by the second network device misses a flow entry, the second network device may report the message 108 to the first network device, and after determining that there is no flow entry matching the message 108, the first network device may generate a flow entry corresponding to the message 108. Of course, in other embodiments, the first network device may also obtain the flow entry in other manners, which is not limited in the present disclosure.

In this embodiment of the present disclosure, after the first network device obtains the flow entry, the first network device may control the second network device to add the flow entry. For example, the first network device may control the second network device to add the flow entry in the following Manner I or Manner II.

Manner I. After receiving a first message matching the flow entry, the first network device may control the second network device to add the flow entry. The second network device may forward all messages matching the flow entry to the first network device, and the first network device updates the protocol state of the flow entry according to the messages matching the flow entry and performs aging management on the flow entry according to the protocol state of the flow entry, so as to control the second network device to delete the flow entry when the flow entry needs to be aged.

Based on this, the control of the time for deleting the flow entry based on the protocol state of the flow entry may comprise: when aging time corresponding to a current protocol state of the flow entry is reached, deleting the flow entry thereof; and correspondingly, controlling the second network device to delete the flow entry under a certain condition may specifically comprise: when the aging time corresponding to the current protocol state of the flow entry is reached, controlling the second network device to delete the flow entry.

Manner II. The first network device may control the second network device to add the flow entry when the protocol state of the flow entry satisfies a certain condition. Satisfying a certain condition may refer to that the protocol state of the flow entry is the established state. Since network connection usually needs to switch between multiple protocol states during the establishment process and the number of messages during the establishment process is small, by controlling the second network device to add the flow entry when the protocol state of the flow entry is the established state, it can not only prevent the first network device from having to frequently delete the flow entry on the second network device due to many connection establishment failures but also simplify the implementation.

On the basis of Manner II, the second network device may forward all messages matching the flow entry to the first network device, and the first network device updates the protocol state of the flow entry according to the messages matching the flow entry and performs aging management on the flow entry according to the protocol state of the flow entry, so as to control the second network device to delete the flow entry when the flow entry needs to be aged. Similarly, the control of the time for deleting the flow entry based on the protocol state of the flow entry may comprise: when aging time corresponding to a current protocol state of the flow entry is reached, deleting the flow entry thereof; and correspondingly, controlling the second network device to delete the flow entry under a certain condition may specifically comprise: when the aging time corresponding to the current protocol state of the flow entry is reached, controlling the second network device to delete the flow entry.

In the above-described embodiment, the second network device is completely passive in the deletion of the flow entry. In other words, it deletes the flow entry only when the first network device controls it to do so, and the first network device implements the entire content of the aging management of the flow entry. For example, the second network device may also actively delete the flow entry, and the first network device may control the aging time of the flow entry on the second network device, wherein the aging time corresponds to the protocol state of the flow entry, and when the aging time of the flow entry is reached, the second network device may actively delete the flow entry. Moreover, considering that service messages are transmitted in the established state, and the number of service messages is usually larger than that of non-service messages, the speed of forwarding the service messages is very important to user experience. As the second network device may perform forwarding processing mainly on messages in the established state, the aging time configured by the first network device for the second network device may specifically be the aging time corresponding to the established state of the flow entry.

Therefore, on the basis of Manner II, in Step 308, before forwarding the message matching the flow entry to the first network device, the second network device may further determine whether the message satisfies a preset reporting condition: if so, the message is forwarded to the first network device; and if not, the message is not forwarded to the first network device. When the message satisfies the preset reporting condition, it may represent that the first network device needs to directly manage the aging of the flow entry according to other protocol states than the established state of the flow entry. When the message fails to satisfy the preset reporting condition, it may represent that the second network device needs to manage the flow entry thereof according to the aging time corresponding to the established state controlled by the first network device, so as to achieve indirect management of the aging of the flow entry by the first network device according to the protocol state of the flow entry. The preset reporting condition may be configured to determine whether it is a message corresponding to a connection release process, and if it is the message corresponding to the connection release process, it represents that the preset reporting condition is satisfied. Taking a TCP connection as an example, the FIN message in the TCP connection release process can be determined based on whether the FIN field in the message is 1, and the RST message in the TCP connection release process can be determined based on whether the RST field in the message is 1.

On this basis, the first network device may implement direct management of the aging of the flow entry in the following Manner A or Manner B according to other protocol states than the established state of the flow entry, so as to achieve partial content of the first network device's control of the time for deleting the flow entry based on the protocol state of the flow entry.

Manner A. When controlling the second network device to add the flow entry, the first network device may further set for the flow entry a flag sent to the second network device; and when controlling the second network device to delete the flow entry, the first network device may further clear the flag of the flow entry sent to the second network device. Correspondingly, performing aging management on the flow entry based on the protocol state of the flow entry may comprise when aging time corresponding to a current protocol state of the flow entry is reached, determining whether the flow entry is set with a flag sent to the second network device; and if the flow entry is set with the flag sent to the second network device, retaining the flow entry. Further, if the flow entry is not set with the flag sent to the second network device, the flow entry thereof is deleted.

Manner B. Performing aging management on the flow entry based on the protocol state of the flow entry may comprise when aging time corresponding to a current protocol state of the flow entry is reached, determining by the first network device whether the current protocol state of the flow entry is the established state; and if the current protocol state of the flow entry is the established state, retaining the flow entry. Further, if the current protocol state of the flow entry is not the established state, the flow entry thereof is deleted.

In this embodiment of the present disclosure, on the basis of the above-described Manner A and Manner B, controlling the second network device to delete the flow entry under a certain condition may specifically comprise: determining by the first network device whether the message matching the flow entry received from the second network device satisfies a preset deletion condition; and if the message matching the flow entry received from the second network device satisfies the preset deletion condition, controlling the second network device to delete the flow entry. As an example, the preset deletion condition may be configured to determine whether it is a message corresponding to a connection release process, and if it is the message corresponding to the connection release process, it represents that the preset deletion condition is satisfied.

In this embodiment of the present disclosure, on the basis of the above-described Manner II, since the second network device can actively delete the flow entry thereof, in order to enable the flow entry on the first network device to be also deleted when the second network device actively deletes the flow entry thereof, Manner II may further comprise: when the first network device determines that aging time corresponding to a current protocol state of the flow entry has been reached, and the flow entry on the second network device has been deleted, deleting the flow entry thereof.

Taking TCP as the communication protocol for example, the following describes how the first network device controls the second network device to add the flow entry when the protocol state of the flow entry is the established state.

Figure 4:
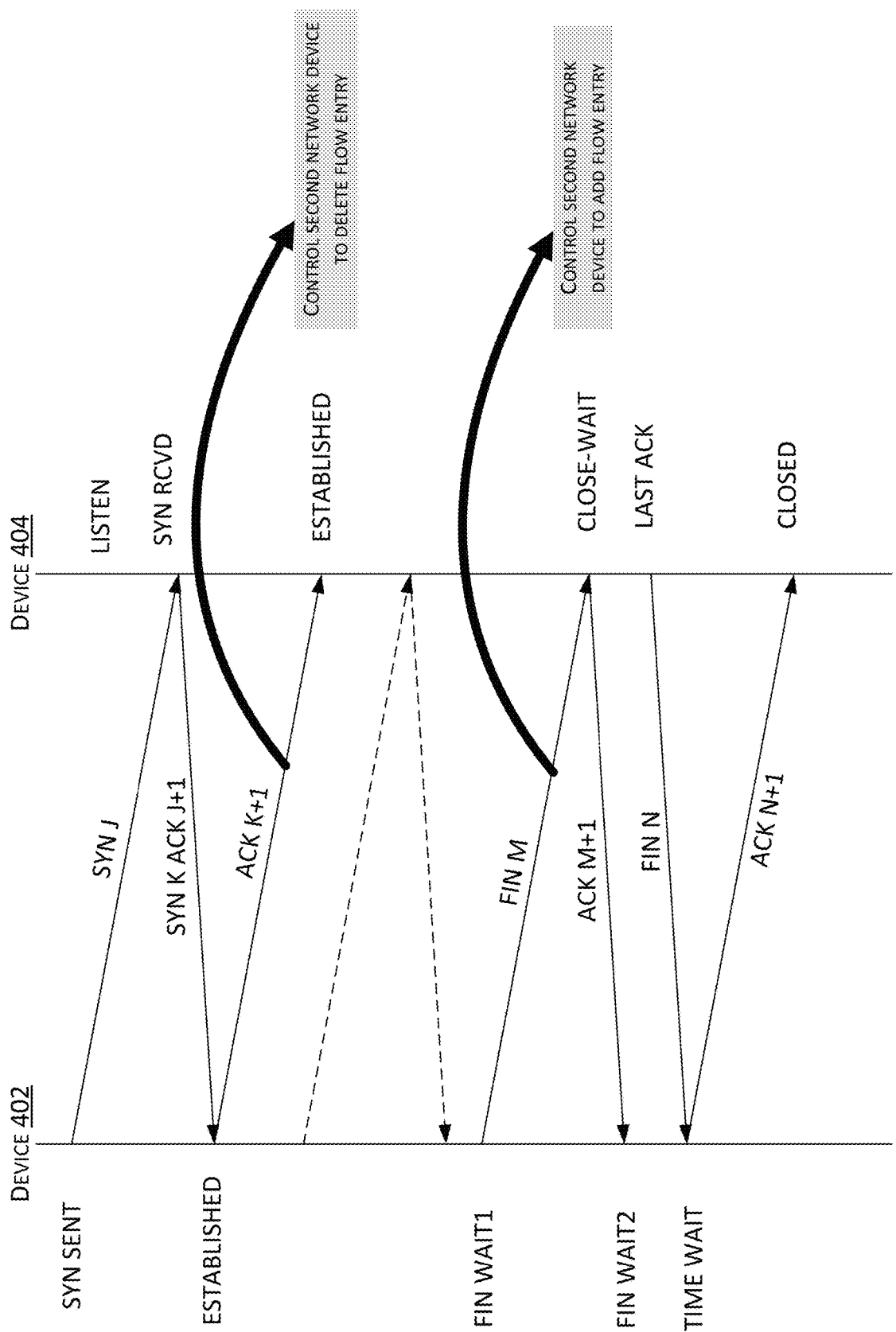
FIG. 4 is a schematic diagram of a TCP connection message interaction process provided by an embodiment of the present disclosure.

First, as shown in FIG. 4, for the first message of the three messages in the TCP "three-way handshake" connection establishment process in FIG. 4, i.e., the SYN J message where J is the initial sequence number selected by the device 402, as the SYN J message is the first message in the TCP connection establishment process, the second network device normally does not have a corresponding flow entry. The second network device thus forwards the SYN J message to the first network device. After receiving the SYN J message, the first network device may generate a flow entry corresponding to the SYN J message and set the initial protocol state of the flow entry as a SYN SENT state. The first network device may perform forwarding processing on the SYN J message according to the flow entry, and the first network device may perform aging management on the flow entry thereof according to the aging time corresponding to the SYN SENT state.

Then, for the second message of the three messages in the TCP "three-way handshake" connection establishment process in FIG. 4, i.e., the SYN K ACKJ+1 message where ACKJ+1 represents the response to the SYN J message, and K is the initial sequence number selected by the device 404, as there is still no corresponding flow entry on the second network device, the second network device forwards the SYN K ACKJ+1 message to the first network device. Supposing that the first network device receives the SYN K ACK J+1 message before the flow entry reaches the aging time corresponding to the SYN SENT state, the first network device may update the protocol state of the flow entry to the SYN RCVD state and further, according to the aging time corresponding to the SYN RCVD state, continue to perform aging management on the flow entry thereof. In addition, the first network device may perform forwarding processing on the SYN K ACKJ+1 message according to the flow entry. Supposing that the first network device has not received the SYN K ACKJ+1 message when the flow entry reaches the aging time corresponding to the SYN RCVD state, the first network device deletes the flow entry thereof.

Next, for the third message of the three messages in the TCP "three-way handshake" connection establishment process in FIG. 4, i.e., the ACK K+1 message where ACK K+1 represents the response to the SYN K message, as there is still no corresponding flow entry on the second network device, the second network device forwards the ACK K+1 message to the first network device. Supposing that the first network device receives the ACK K+1 message before the flow entry reaches the aging time corresponding to the SYN RCVD state, the first network device may update the protocol state of the flow entry to the established state, send the flow entry and the aging time corresponding to the established state of the flow entry to the second network device, and set for the flow entry a flag sent to the second network device. In addition, the first network device may perform forwarding processing on the ACK K+1 message according to the flow entry. Supposing that the first network device has not received the ACK K+1 message when the flow entry reaches the aging time corresponding to the SYN RCVD state, the first network device deletes the flow entry thereof.

Still next, for the service message X in the established state as shown by the dotted line in FIG. 4, since the corresponding flow entry already exists on the second network device, the second network device performs forwarding processing on the X message according to the flow entry and performs aging management on the flow entry thereof according to the aging time corresponding to the established state. In addition, the second network device may determine whether the X message satisfies the preset reporting condition. Since the X message is not a message corresponding to the TCP connection release process, it does not satisfy the preset reporting condition. Supposing that the second network device has not received the next X message when the flow entry reaches the aging time corresponding to the established state, the second network device deletes the flow entry thereof. Further, when determining that the aging time corresponding to the established state of the flow entry has been reached, and the flow entry on the second network device has been deleted, the first network device may delete the flow entry thereof.

Afterwards, for the first message of the four messages in the TCP "four-way wave" connection release process in FIG. 4, i.e., the FIN M message, as the corresponding flow entry already exists on the second network device, the second network device may perform forwarding processing on the FIN M message according to the flow entry and determine whether the FIN M message satisfies the preset reporting condition. Because the FIN M message is a message corresponding to the TCP connection release process, the second network device may forward the FIN M message to the first network device. Further, after receiving the FIN M message, the first network device may control the second network device to delete the flow entry. In addition, the first network device may update the protocol state of the flow entry to the FIN WAIT1 state according to the FIN M message and perform aging management on the flow entry thereof according to the aging time corresponding to the FIN WAIT1 state.

Then, for the second message of the four messages in the TCP "four-way wave" connection release process in FIG. 4, i.e., the ACK M+1 message, as there is no corresponding flow entry on the second network device, the second network device forwards the ACK M+1 message to the first network device. Supposing that the first network device receives the ACK M+1 message before the flow entry reaches the aging time corresponding to the FIN WAIT1 state, the first network device may update the protocol state of the flow entry to the CLOSE-WAIT state and further perform aging management on the flow entry thereof according to the aging time corresponding to the CLOSE-WAIT state. In addition, the first network device may perform forwarding processing on the ACK M+1 message according to the flow entry. Supposing that the first network device has not received the ACK M+1 message when the flow entry reaches the aging time corresponding to the FIN WAIT1 state, the first network device deletes the flow entry thereof.

It should be noted that the processing performed by the first network device and the second network device on the third message in the four messages in the TCP "four-way wave" connection release process in FIG. 4, i.e., the FIN N message, is similar to that on the ACK M+1 messages, and is not elaborated herein again.

Finally, for the fourth message of the four messages in the TCP "four-way wave" connection release process in FIG. 4, i.e., the ACK N+1 message, as there is no corresponding flow entry on the second network device, the second network device forwards the ACK N+1 message to the first network device. Supposing that the first network device receives the ACK N+1 message before the flow entry reaches the aging time corresponding to the LAST ACK state, the first network device may perform forwarding processing on the ACK N+1 message according to the flow entry and delete the flow entry thereof after the forwarding processing. Supposing that the first network device has not received the ACK N+1 message when the flow entry reaches the aging time corresponding to the LAST ACK state, the first network device deletes the flow entry thereof.

It should be noted that the message interaction processes happening in the TCP connection establishment and release processes in FIG. 4 are for illustration purposes only. In FIG. 4, the FIN WAIT2, TIME WAIT, and CLOSED states are also TCP states.

According to the method for controlling a flow entry provided by the embodiments of the present disclosure, a first network device controls a second network device to add the flow entry, and the second network device, after receiving a message matching the flow entry, performs forwarding processing on the message according to the flow entry; the second network device forwards the message to the first network device, and the first network device controls the second network device to delete the flow entry under a certain condition according to a received message matching the flow entry, wherein the first network device is responsible for performing aging management on the flow entry based on a protocol state of the flow entry, so that when the second network device performs message forwarding according to the flow entry, the first network device can perform aging management on the flow entry on the second network device according to the protocol state of the flow entry, thus enabling the aging of the flow entry on the second network device to meet the requirement for performing aging management on the flow entry based on the protocol state of the flow entry and avoiding problems caused by irrational aging of the flow entry on the second network device in the related art, such as the problem that the message cannot be forwarded normally due to early deletion of the flow entry on the second network device, or the problem that the message is forwarded incorrectly due to delayed deletion of the flow entry on the second network device, thereby improving the rationality of the aging of the flow entry on the second network device.

Figure 5:
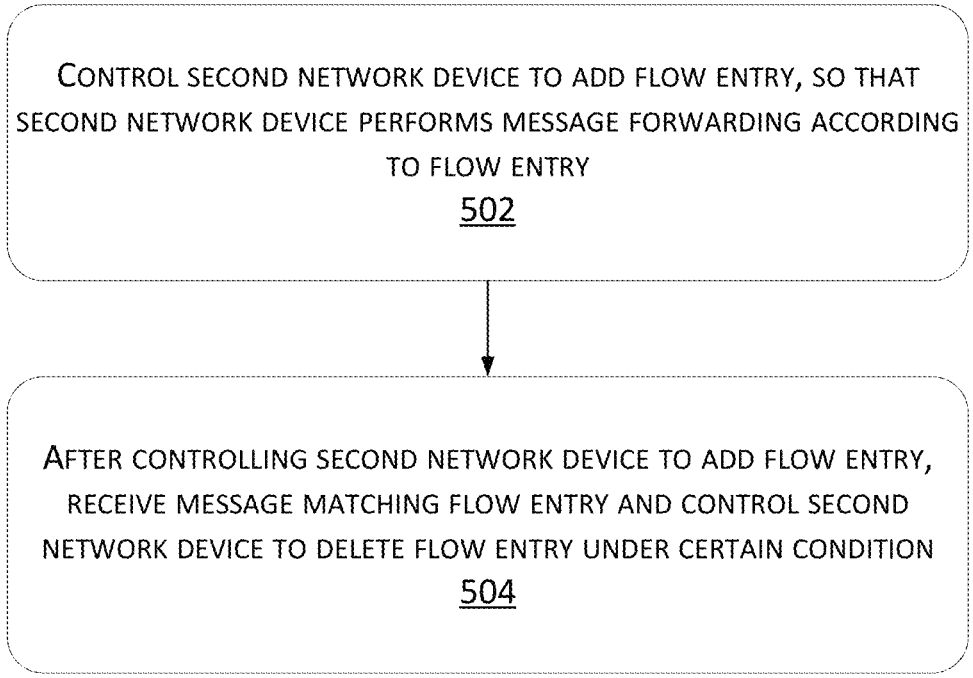
FIG. 5 is a schematic flowchart of a method for controlling a flow entry provided by another embodiment of the present disclosure.

FIG. 5 is a schematic flowchart of a method for controlling a flow entry provided by another embodiment of the present disclosure. As shown in FIG. 5, the method provided by this embodiment may comprise the following steps:

Step 502, control a second network device to add the flow entry, so that the second network device performs message forwarding according to the flow entry; and Step 504, after controlling the second network device to add the flow entry, receive a message matching the flow entry and control the second network device to delete the flow entry under a certain condition;

wherein the first network device is responsible for control of time for deleting the flow entry based on a protocol state of the flow entry.

It should be noted that this embodiment is mainly directed at the technical solution of the first network device in the embodiment shown in FIG. 3. For the implementation process and technical effect of the technical solution, reference may be made to the relevant description in the method embodiment shown in FIG. 3, which is not elaborated herein again.

Figure 6:
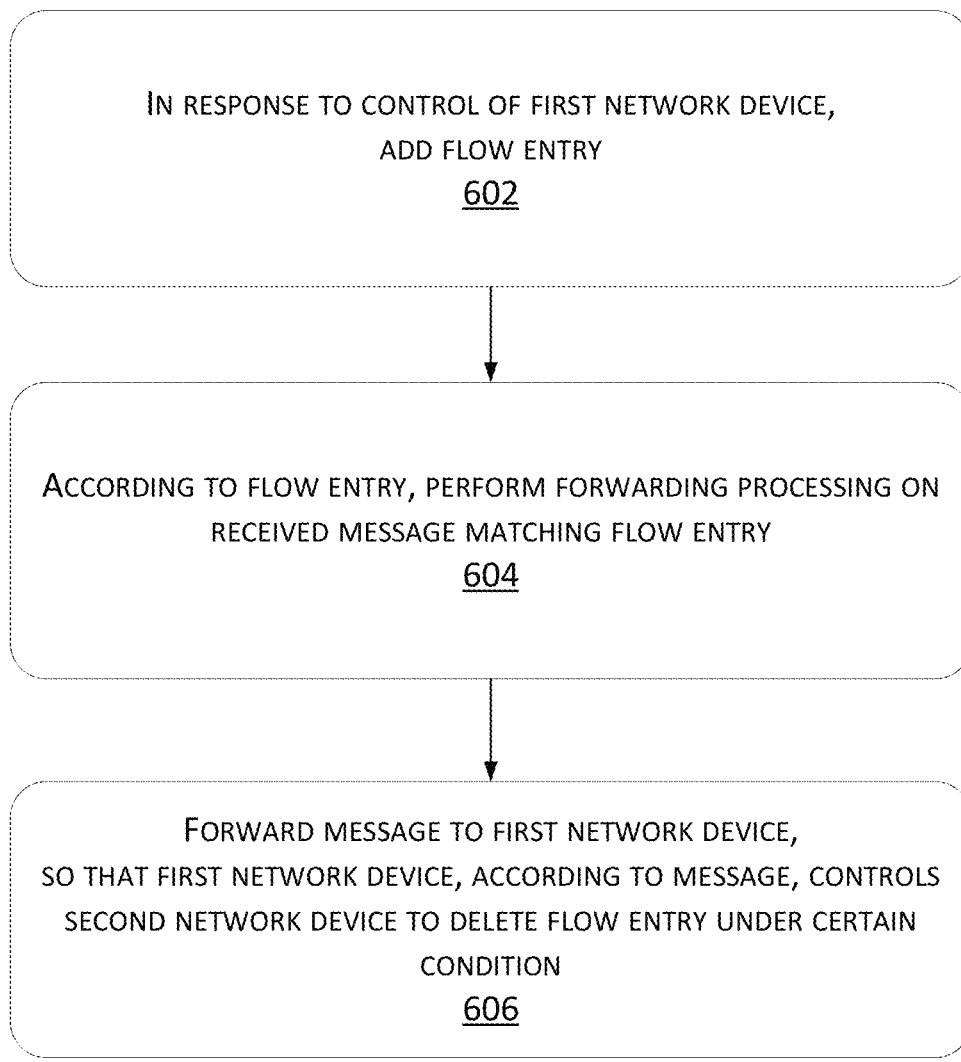
FIG. 6 is a schematic flowchart of a method for controlling a flow entry provided by another embodiment of the present disclosure.

FIG. 6 is a schematic flowchart of a method for controlling a flow entry provided by another embodiment of the present disclosure. As shown in FIG. 6, the method provided by this embodiment may comprise the following steps:

Step 602, in response to control of a first network device, add the flow entry;

Step 604, according to the flow entry, perform forwarding processing on a received message matching the flow entry; and Step 606, forward the message to the first network device, so that the first network device, according to the message, controls the second network device to delete the flow entry under a certain condition;

wherein the first network device is responsible for control of time for deleting the flow entry based on a protocol state of the flow entry.

It should be noted that this embodiment is mainly directed at the technical solution of the second network device in the embodiment shown in FIG. 3. For the implementation process and technical effect of the technical solution, reference may be made to the relevant description in the method embodiment shown in FIG. 3, which is not elaborated herein again.

Figure 7:
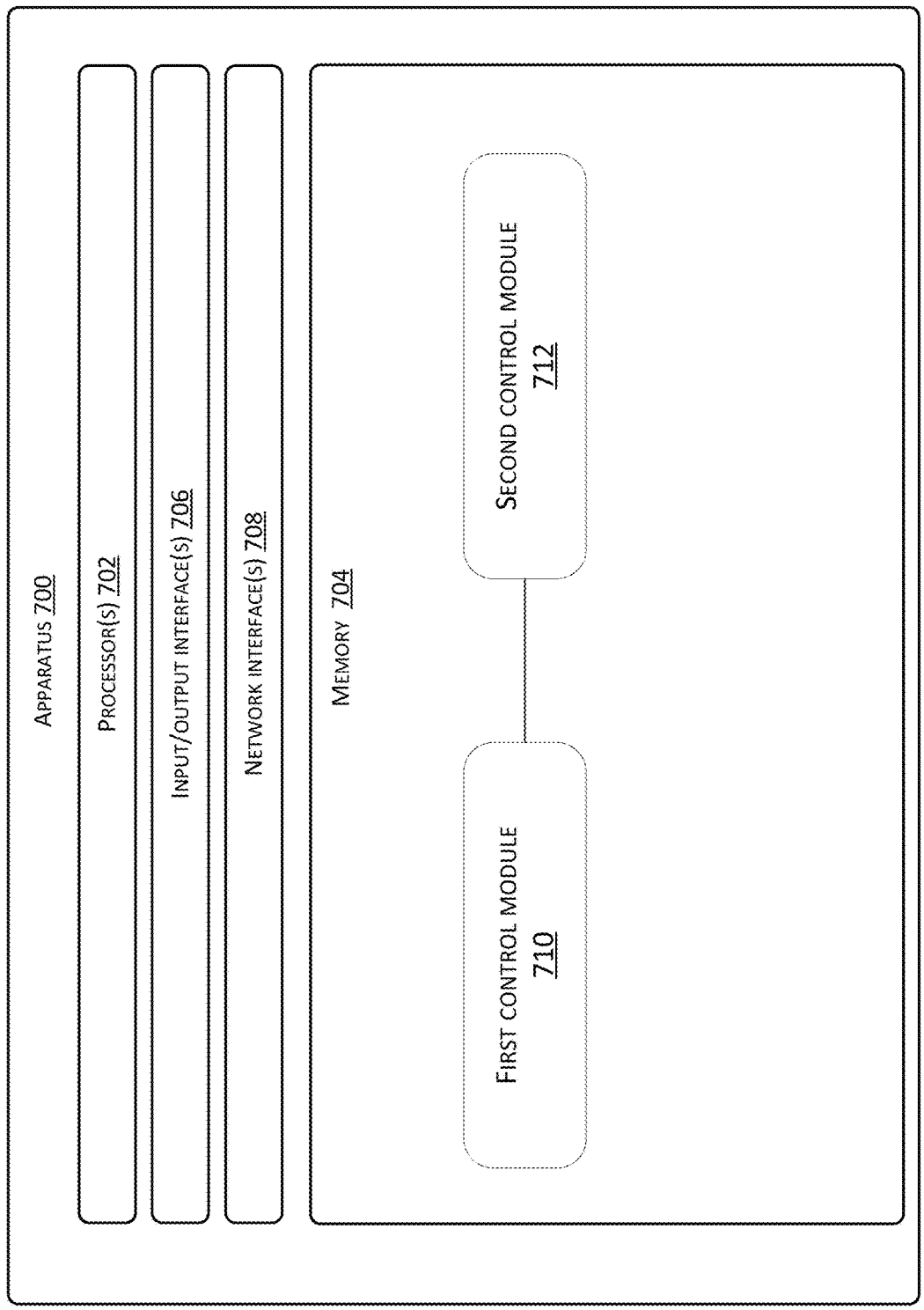
FIG. 7 is a schematic structural diagram of an apparatus for controlling a flow entry provided by an embodiment of the present disclosure.

FIG. 7 is a schematic structural diagram of an apparatus for controlling a flow entry provided by an embodiment of the present disclosure. With reference to FIG. 7, this embodiment provides an apparatus 700 for controlling a flow entry, which can execute the method on the first network device side in the above-described method for controlling a flow entry. Referring to FIG. 7, the apparatus 700 includes one or more processor(s) 702 or data processing unit(s) and memory 704. The apparatus 700 may further include one or more input/output interface(s) 706 and one or more network interface(s) 708. The memory 704 is an example of computer-readable media. The memory 704 may store therein a plurality of modules or units including:

a first control module 710, configured to control a second network device to add the flow entry, so that the second network device performs message forwarding according to the flow entry; and a second control module 712, configured to, after controlling the second network device to add the flow entry, receive a message matching the flow entry and control the second network device to delete the flow entry under a certain condition;

wherein the first network device is responsible for control of time for deleting the flow entry based on a protocol state of the flow entry.

For example, the first control module is specifically configured to control the second network device to add the flow entry when the protocol state of the flow entry is an established state.

For example, the control of the time for deleting the flow entry based on the protocol state of the flow entry comprises controlling aging time of the flow entry of the second network device, wherein the aging time corresponds to the established state of the flow entry.

For example, the apparatus further comprises a flag module configured to, when the second network device is controlled to add the flow entry, set for the flow entry a flag sent to the second network device; and when the second network device is controlled to delete the flow entry, clear the flag of the flow entry sent to the second network device;

the control of the time for deleting the flow entry based on the protocol state of the flow entry further comprises:

when aging time corresponding to a current protocol state of the flow entry is reached, determining whether the flow entry is set with the flag sent to the second network device; and if the flow entry is set with the flag sent to the second network device, retaining the flow entry.

For example, the control of the time for deleting the flow entry based on the protocol state of the flow entry further comprises:

when aging time corresponding to a current protocol state of the flow entry is reached, determining whether the current protocol state of the flow entry is the established state; and if the current protocol state of the flow entry is the established state, retaining the flow entry.

For example, performing aging management on the flow entry based on the protocol state of the flow entry further comprises:

when it is determined that aging time corresponding to a current protocol state of the flow entry has been reached, and the flow entry on the second network device has been deleted, deleting the flow entry thereof.

For example, the second control module 712 is specifically configured to:

determine whether the received message matching the flow entry satisfies a preset deletion condition; and if the message satisfies the preset deletion condition, control the second network device to delete the flow entry.

For example, the preset deletion condition is configured to determine whether it is a message corresponding to a connection release process, and if it is the message corresponding to the connection release process, it represents that the preset condition is satisfied.

The apparatus shown in FIG. 7 may execute the method on the first network device side in the above-described method embodiments. For the part not described in detail in this embodiment, reference may be made to the relevant description of the above-described method embodiments. For the implementation process and technical effect of the technical solution, reference may be made to the description of the above-described method embodiments, which is not elaborated herein again.

Figure 8:
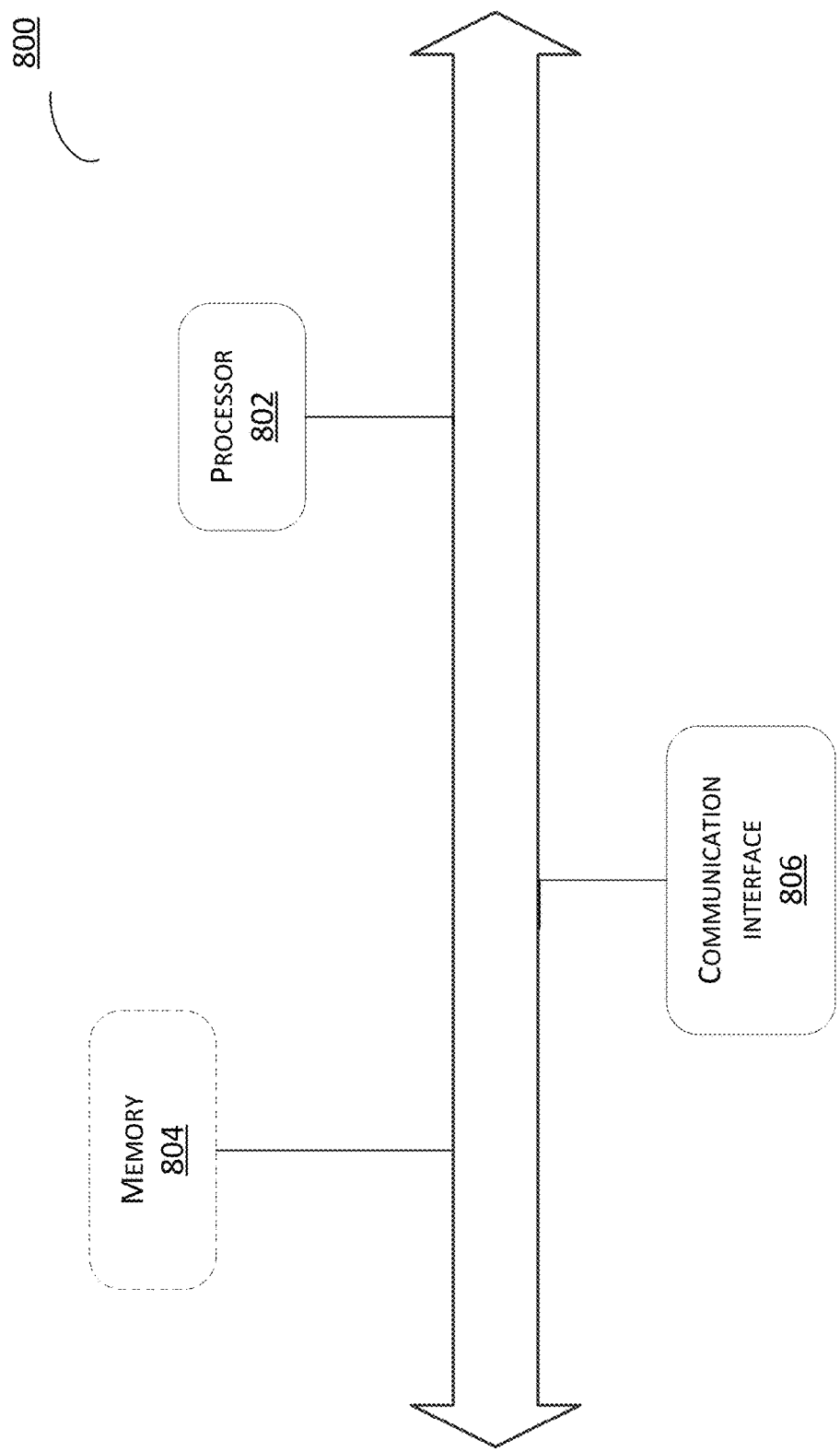
FIG. 8 is a schematic structural diagram of an apparatus for controlling a flow entry provided by another embodiment of the present disclosure.

FIG. 8 is a schematic structural diagram of an apparatus 800 for controlling a flow entry provided by another embodiment of the present disclosure. With reference to FIG. 8, this embodiment provides an apparatus for controlling a flow entry, which can execute the method on the first network device side in the above-described method for controlling a flow entry. For example, the apparatus 800 may comprise: a processor 802 and a memory 804. The memory 804 is an example of computer-readable media. Herein, the memory 804 is configured to store a program that supports a terminal to implement the first network device side provided in the above-described method embodiments, and the processor 802 is configured to execute the program stored in the memory 804.

The program includes one or more computer instructions which, when executed by the processor 802, implement the following steps:

control a second network device to add the flow entry, so that the second network device performs message forwarding according to the flow entry; and after controlling the second network device to add the flow entry, control the second network device to delete the flow entry under a certain condition according to a received message matching the flow entry;

wherein the first network device is responsible for control of time for deleting the flow entry based on a protocol state of the flow entry.

For example, the processor 802 is further configured to perform all or part of the steps on the first network device side in the above-described method embodiments.

Herein, the structure of the apparatus may further comprise a communication interface 806 for the apparatus to communicate with other devices or a communication network.

Figure 9:
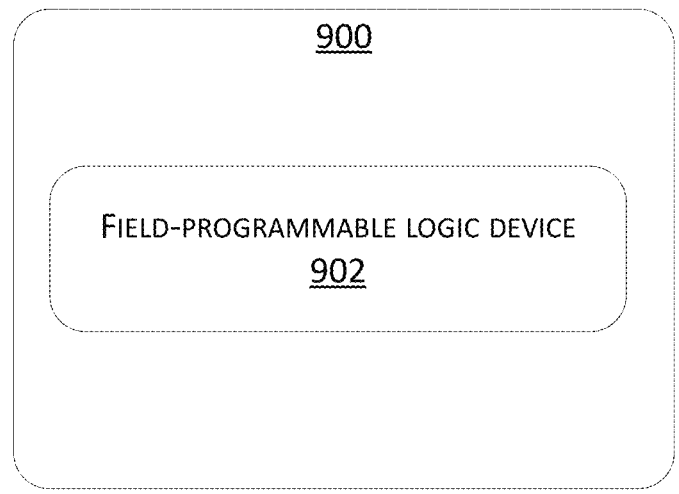
FIG. 9 is a schematic structural diagram of an apparatus for controlling a flow entry according to another embodiment of the present disclosure.

FIG. 9 is a schematic structural diagram of an apparatus 900 for controlling a flow entry provided by another embodiment of the present disclosure. With reference to FIG. 9, this embodiment provides the apparatus 900 for controlling a flow entry, and the apparatus 90 for controlling a flow entry comprises a field-programmable logic device 902. The field-programmable logic device may be, for example, a field-programmable gate array (FPGA) and is configured to:

in response to control of a first network device, add the flow entry;

according to the flow entry, perform forwarding processing on a received message matching the flow entry; and forward the message to the first network device, so that the first network device, according to the message, controls the second network device to delete the flow entry under a certain condition;

wherein the first network device is responsible for control of time for deleting the flow entry based on a protocol state of the flow entry.

In addition, an embodiment of the present disclosure further provides a system for controlling a flow entry, comprising: the apparatus for controlling a flow entry according to the embodiment shown in FIG. 8 and the apparatus according to the embodiment shown in FIG. 9.

Moreover, an embodiment of the present disclosure provides a computer storage medium, configured to store computer software instructions used by a terminal, which includes a program involved in the first network device side in the above-described method embodiments.

An embodiment of the present disclosure provides a computer storage medium, configured to store computer software instructions used by a network device, which includes a program involved in the first network device side in the above-described method embodiments.

The apparatus embodiments described above are only examples, wherein the units described as separate components may or may not be physically separated; and the components displayed as units may or may not be physical units. In other words, the units may be located in one place, or may be distributed on a plurality of network units. Some or all of the modules may be selected according to actual needs to achieve the objectives of the solutions of the embodiments. Those of ordinary skill in the art may understand and implement the embodiments without creative efforts.

Through the description of the above embodiments, a person skilled in the art may clearly understand that each embodiment may be implemented by means of a necessary general hardware platform, and may certainly be implemented by a combination of hardware and software. Based on such understanding, the part of the above technical solutions, which is essential or contributes to the related art, may be embodied in the form of a computer product. The present disclosure may take the form of a computer program product which is embodied on one or more computer-usable storage media (including, but not limited to, disk storage, CD-ROM, optical storage, and so forth) having computer-usable program code contained therein.

The present disclosure is described with reference to flowcharts and/or block diagrams of methods, devices (systems), and computer program products according to embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a processor of a general-purpose computer, a dedicated computer, an embedded processor, or another programmable device to generate a machine, so that the instructions executed by the processor of the computer or another programmable generate an apparatus for implementing a specific function in one or more processes in the flowcharts and/or in one or more blocks in the block diagrams.

These computer program instructions may also be stored in a computer-readable memory that can instruct the computer or another programmable device to work in a specific manner, so that the instructions stored in the computer-readable memory generate an artifact that includes an instruction apparatus. The instruction apparatus implements a function specified in one or more processes in the flowcharts and/or in one or more blocks in the block diagrams.

These computer program instructions may also be loaded onto a computer or another programmable device, so that a series of operation steps are performed on the computer or another programmable device to generate computer-implemented processing. Therefore, the instructions executed on the computer or another programmable device are used to provide steps for implementing a function specified in one or more processes in the flowcharts and/or in one or more blocks in the block diagrams.

In a typical configuration, a computing device comprises one or more processors (CPU), an input/output interface, a network interface, and a memory.

The memory may include a volatile memory on a computer-readable medium, a random-access memory (RAM) and/or a non-volatile memory, and the like, such as a read-only memory (ROM) or a flash random access memory (flash RAM). The memory is an example of the computer-readable media.

Computer-readable media further include non-volatile and volatile, removable and non-removable media employing any method or technique to achieve information storage. The information may be computer-readable instructions, data structures, modules of programs, or other data. Examples of computer storage media include, but are not limited to, a phase-change random access memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disc read-only memory (CD-ROM), a digital versatile disc (DVD) or other optical memories, a magnetic cassette tape, a magnetic tape, a magnetic disk storage or other magnetic storage devices, or any other non-transmission medium, which may be used to store information that can be accessed by a computing device. As defined herein, the computer-readable media do not include transitory media, such as modulated data signals and carriers.

Finally, it should be noted that the above embodiments are only used to illustrate, rather than limit, the technical solutions of the present disclosure. Although the present disclosure has been described in detail with reference to the foregoing embodiments, those of ordinary skill in the art should understand that the technical solutions recited in the foregoing embodiments may still be modified, or some or all of the technical features thereof may be replaced with equivalents. These modifications or replacements do not make the essence of the corresponding technical solutions deviate from the scope of the technical solutions of the embodiments of the present disclosure.

The present disclosure may further be understood with clauses as follows.

Clause 1. A method for controlling a flow entry, applied to a first network device, the method comprising:
controlling a second network device to add the flow entry, so that the second network device performs message forwarding according to the flow entry; and
after controlling the second network device to add the flow entry, receiving a message matching the flow entry and controlling the second network device to delete the flow entry under a preset condition,
wherein the first network device is responsible for controlling time for deleting the flow entry based on a protocol state of the flow entry.

Clause 2. The method according to clause 1, wherein the controlling the second network device to add the flow entry comprises controlling the second network device to add the flow entry when the protocol state of the flow entry is an established state for connection.

Clause 3. The method according to clause 2, wherein the control of the time for deleting the flow entry based on the protocol state of the flow entry comprises controlling an aging time of the flow entry of the second network device, wherein the aging time corresponds to the established state of the flow entry.

Clause 4. The method according to clause 3, wherein the method further comprises:
when controlling the second network device to add the flow entry, setting for the flow entry a flag sent to the second network device; and
when controlling the second network device to delete the flow entry, clearing the flag sent to the second network device,
wherein the control of the time for deleting the flow entry based on the protocol state of the flow entry further comprises:
when an aging time corresponding to a current protocol state of the flow entry is reached, determining whether the flow entry is set with the flag sent to the second network device; and
in response to determining that the flow entry is set with the flag sent to the second network device, retaining the flow entry.

Clause 5. The method according to clause 3, wherein the controlling the time for deleting the flow entry based on the protocol state of the flow entry further comprises:
when an aging time corresponding to a current protocol state of the flow entry is reached, determining whether the current protocol state of the flow entry is the established state; and
in response to determining that the current protocol state of the flow entry is the established state, retaining the flow entry.

Clause 6. The method according to clause 3, wherein the controlling the time for deleting the flow entry based on the protocol state of the flow entry further comprises:
determining that an aging time corresponding to a current protocol state of the flow entry has been reached, and the flow entry in the second network device has been deleted; and
deleting the flow entry thereof. Clause 7. The method according to any one of clauses 1-6, wherein the controlling the second network device to delete the flow entry under the preset condition according to the received message matching the flow entry comprises:
determining whether the received message matching the flow entry satisfies a preset deletion condition; and
in response to determining that the message satisfies the preset deletion condition, controlling the second network device to delete the flow entry.

Clause 8. The method according to clause 7, wherein:
the preset deletion condition is configured to determine whether the message corresponds to a connection release process; and
in response to a determination that the message corresponding to the connection release process, the preset deletion condition is satisfied.

Clause 9. A method for controlling a flow entry, applied to a second network device, the method comprising:
in response to control of a first network device, adding the flow entry;
according to the flow entry, performing forwarding processing on a received message matching the flow entry; and
forwarding the message to the first network device, so that the first network device, according to the message, controls the second network device to delete the flow entry under a preset condition,
wherein the first network device is responsible for controlling time for deleting the flow entry based on a protocol state of the flow entry.

Clause 10. The method according to clause 9, wherein:
the controlling the time for deleting the flow entry based on the protocol state of the flow entry comprises controlling an aging time of the flow entry of the second network device, wherein the aging time corresponds to an established state for connection of the flow entry; and
the method further comprises, in response to the control of the first network device, determining the aging time of the flow entry and deleting the flow entry when the flow entry reaches the aging time.

Clause 11. The method according to clause 9 or 10, wherein the forwarding the message to the first network device comprises:
determining whether the message satisfies a preset reporting condition; and
in response to determining that the message satisfies the preset reporting condition, forwarding the message to the first network device.

Clause 12. The method according to clause 11, wherein:
the preset reporting condition is configured to determine whether it is a message corresponding to a connection release process; and
in response to a determination that the message corresponds to the connection release process, the preset reporting condition is satisfied.

Clause 13. An apparatus for controlling a flow entry, applied to a first network device, the apparatus comprising:
a first control module, configured to control a second network device to add the flow entry, so that the second network device performs message forwarding according to the flow entry; and
a second control module, configured to, after controlling the second network device to add the flow entry, receive a message matching the flow entry and control the second network device to delete the flow entry under a preset condition, wherein the first network device is responsible for controlling time for deleting the flow entry based on a protocol state of the flow entry.

Clause 14. An apparatus for controlling a flow entry, comprising: a memory and a processor, wherein the memory is configured to store one or more computer instructions, and the one or more computer instructions, when executed by the processor, implement the method according to any one of clauses 1 to 8.

Clause 15. An apparatus for controlling a flow entry, the apparatus comprising a field-programmable logic device, the field-programmable logic device being configured to:
in response to control of a first network device, add the flow entry;
according to the flow entry, perform forwarding processing on a received message matching the flow entry; and
forward the message to the first network device, so that the first network device, according to the message, controls the second network device to delete the flow entry under a preset condition,
wherein the first network device is responsible for controlling time for deleting the flow entry based on a protocol state of the flow entry.

Clause 16. A system for controlling a flow entry, comprising the apparatus according to clause 14 and the apparatus according to clause 15.

What is claimed is:

1. A method comprising:
controlling, by a first network device, a second network device to add a flow entry;
controlling time for deleting the flow entry based on a protocol state of the flow entry, the controlling the time for deleting the flow entry based on the protocol state of the flow entry including:
in response to determining that an aging time corresponding to a current protocol state of the flow entry is reached, determining whether the flow entry is set with a flag sent to the second network device; and
in response to determining that the flow entry is set with the flag sent to the second network device, retaining the flow entry; and
after controlling the second network device to add the flow entry, receiving a message matching the flow entry and controlling the second network device to delete the flow entry under a preset condition.

2. The method according to claim 1, wherein the second network device performs message forwarding according to the flow entry.

3. The method according to claim 1, wherein the controlling the second network device to add the flow entry comprises controlling the second network device to add the flow entry in response to determining that the protocol state of the flow entry is an established state for connection.

4. The method according to claim 1, wherein the controlling the time for deleting the flow entry based on the protocol state of the flow entry comprises controlling the aging time of the flow entry of the second network device, wherein the aging time corresponds to an established state for connection of the flow entry.

5. The method according to claim 4, further comprising:
in response to controlling the second network device to add the flow entry, setting for the flow entry the flag sent to the second network device.

6. The method according to claim 5, further comprising:
in response to controlling the second network device to delete the flow entry, clearing the flag sent to the second network device.

7. The method according to claim 1, wherein the controlling the time for deleting the flow entry based on the protocol state of the flow entry further comprises:
in response to determining that the aging time corresponding to the current protocol state of the flow entry is reached, determining whether the current protocol state of the flow entry is an established state for connection; and
in response to determining that the current protocol state of the flow entry is the established state, retaining the flow entry.

8. The method according to claim 1, wherein the controlling the time for deleting the flow entry based on the protocol state of the flow entry further comprises:
determining that the aging time corresponding to the current protocol state of the flow entry has been reached, and the flow entry in the second network device has been deleted; and
deleting the flow entry thereof.

9. The method according to claim 1, wherein the controlling the second network device to delete the flow entry under the preset condition comprises:
determining whether the received message matching the flow entry satisfies a preset deletion condition; and
in response to determining that the message satisfies the preset deletion condition, controlling the second network device to delete the flow entry.

10. The method according to claim 9, wherein:
the preset deletion condition is that the message corresponds to a connection release process.

11. The method according to claim 10, further comprising:
in response to a determination that the message corresponding to the connection release process, determining that the preset deletion condition is satisfied.

12. A method comprising:
in response to control of a first network device, adding a flow entry;
according to the flow entry, performing forwarding processing on a message matching the flow entry; and
forwarding the message to the first network device, so that the first network device, according to the message, controls a second network device to delete the flow entry under a preset condition,
wherein the first network device is responsible for controlling time for deleting the flow entry based on a protocol state of the flow entry, the controlling the time for deleting the flow entry based on the protocol state of the flow entry including:
in response to determining that an aging time corresponding to a current protocol state of the flow entry is reached, determining whether the current protocol state of the flow entry is an established state for connection; and
in response to determining that the current protocol state of the flow entry is the established state, retaining the flow entry.

13. The method according to claim 12, wherein the forwarding the message to the first network device comprises:
determining whether the message satisfies a preset reporting condition; and
in response to determining that the message satisfies the preset reporting condition, forwarding the message to the first network device.

14. The method according to claim 13, wherein the preset reporting condition is configured to determine whether it is a message corresponding to a connection release process.

15. The method according to claim 14, further comprising, in response to a determination that the message corresponds to the connection release process, determining that the preset reporting condition is satisfied.

16. One or more memories storing thereon computer-readable instructions that, when executed by one or more processors, cause the one or more processors to perform acts comprising:
controlling, by a first network device, a second network device to add a flow entry; and
after controlling the second network device to add the flow entry, receiving a message matching the flow entry and controlling the second network device to delete the flow entry under a preset condition,
wherein the first network device is responsible for controlling time for deleting the flow entry based on a protocol state of the flow entry, the controlling the time for deleting the flow entry based on the protocol state of the flow entry including:
in response to determining that an aging time corresponding to a current protocol state of the flow entry is reached, determining whether the current protocol state of the flow entry is an established state for connection; and
in response to determining that the current protocol state of the flow entry is the established state, retaining the flow entry.

17. The one or more memories according to claim 16, wherein the controlling the second network device to add the flow entry comprises controlling the second network device to add the flow entry when the protocol state of the flow entry is the established state for connection.

18. The one or more memories according to claim 16, wherein the second network device performs message forwarding according to the flow entry.

19. The one or more memories according to claim 16, wherein the controlling the second network device to add the flow entry comprises controlling the second network device to add the flow entry in response to determining that the protocol state of the flow entry is the established state for connection.

20. The one or more memories according to claim 16, wherein the controlling the second network device to delete the flow entry under the preset condition comprises:
determining whether the received message matching the flow entry satisfies a preset deletion condition; and
in response to determining that the message satisfies the preset deletion condition, controlling the second network device to delete the flow entry.

* * * * *